(12) United States Patent  (10) Patent No.: US 7,983,145 B2
Frenger  (45) Date of Patent: Jul. 19, 2011

(54) DFT SPREAD OFTM

(75) Inventor: Pål Frenger, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 162 days.

(21) Appl. No.: 12/513,315

(22) PCT Filed: Nov. 2, 2007

(86) PCT No.: PCT/SE2007/050815
§ 371 (c)(1),
(2), (4) Date: May 14, 2009

(87) PCT Pub. No.: WO2008/054322
PCT Pub. Date: May 8, 2008

(65) Prior Publication Data
US 2010/0111209 A1  May 6, 2010

(30) Foreign Application Priority Data
Nov. 2, 2006 (SE) ...................................... 0602319

(51) Int. Cl.
*H04J 11/00* (2006.01)
(52) U.S. Cl. ........................................ 370/208; 370/210
(58) Field of Classification Search .................. 370/208, 370/210
See application file for complete search history.

(56) References Cited

U.S. PATENT DOCUMENTS

| | | | | |
|---|---|---|---|---|
| 2006/0120447 A1* | 6/2006 | Trachewsky et al. | ......... | 375/240 |
| 2007/0189405 A1* | 8/2007 | Qu | ................. | 375/260 |
| 2009/0040919 A1* | 2/2009 | Muharemovic et al. | ...... | 370/210 |
| 2009/0109835 A1* | 4/2009 | Green | ........................... | 370/210 |
| 2010/0110876 A1* | 5/2010 | Trachewsky et al. | ......... | 370/210 |
| 2010/0111209 A1* | 5/2010 | Frenger | ......................... | 375/260 |
| 2010/0226458 A1* | 9/2010 | Dent et al. | ..................... | 375/296 |

FOREIGN PATENT DOCUMENTS

| | | |
|---|---|---|
| EP | 1267513 A2 | 12/2002 |
| WO | 00/08792 | 2/2000 |

OTHER PUBLICATIONS

3rd Generation Partnership Project. "3GPP LTE: Introducing Single-Carrier FDMA." Agilent Measurement Journal, Issue 4, Jan. 1, 2008.
Khan, A. A. "Digital Signal Processing Fundamentals." Da Vinci Engineering Press, 2005, Hingham, MA, USA, selected pages.
Parker, G. "Effecting Frequency Shifts with a DFT Filterbank." 2001 IEEE International Conference on Acoustics, Speech, and Signal Processing (ICASSP '01), vol. 6, May 7-11, 2001, pp. 3669-3672.
Jungnickel, V. et al. "SC-FDMA Waveform Design, Performance, Power dynamics and Evolution to MIMO." 2007 IEEE International Conference on Portable Information Devices (PORTABLE07), May 25-29, 2007, pp. 1-6.

* cited by examiner

*Primary Examiner* — Andrew Lee
(74) *Attorney, Agent, or Firm* — Coats & Bennett, P.L.L.C.

(57) ABSTRACT

The invention applies Discrete Fourier Transform (DFT)-spread-OFDM (Orthogonal Frequency Division Multiple Access), which is proposed for the Third Generation Partnership Program Long Term Evolution (3GPP LTE) uplink. The core of the invention is that we use a cyclic frequency shift operation over part of the bandwidth spanned by the Inverse Fast Fourier Transform (IFFT). Furthermore, the cyclic frequency shift enables efficient inter-cell interference coordination in case neighboring cells hop with the same pattern and different initial offsets. An equivalent operation may be performed in the time domain.

20 Claims, 10 Drawing Sheets

DFT SPREAD OFTM

TECHNICAL FIELD

The present application is related to a modification of a transmission scheme proposed for 3G LTE (Long Term Evolution) known as DFT-S-OFDMA (Discrete Fourier Transform Spread Orthogonal Frequency Division Multiple Access).

BACKGROUND OF THE INVENTION

In the standardization of 3GPP (Third Generation Partnership Project) LTE (Long Term Evolution) an orthogonal single carrier transmission scheme with frequency multiplexing of users is selected for the uplink. The uplink transmission scheme proposed for LTE is known as DFT-S-OFDMA and the basic principle is depicted in FIG. 1.

At step 100, a size N DFT (Discrete Fourier Transform) is first applied to a block of N modulation symbols Ndata. This transforms the modulation symbols to the frequency domain. Next, at steps 110-120, spectrum shaping of the thus transformed symbols Ndata is applied in the frequency domain. The first step at 110 involves the bandwidth expansion of the DFT-transformed modulation symbols through block repetition into a larger number of symbols Nused, while the second step at 120 comprises the filtering of the expanded symbols in the frequency domain.

After spectrum shaping, mapping is done to the IFFT (Inverse Fast Fourier Transform) inputs $N_{used}$ at step 130. This mapping can be performed in several different ways. Two different mappings, often referred to as localized and distributed mappings, have been proposed for LTE. In case of localized mapping, the mapping is done to consecutive IFFT inputs and in case of distributed mapping the mapping is done to equally spaced IFFT inputs. Thereafter, at step 140 the mapped modulation symbols $N_{ifft}$ are IFFT-transformed forming a sequential data stream. Finally, at step 150, a so called CP (Cyclic Prefix) is attached to the sequential data stream in order to avoid ISI (Inter Symbol Interference) and ICI (Inter Carrier Interference) at the receiver. The transmitted signal is a low-PAR (Peak-to-Average Power Ratio) "single-carrier" signal despite the apparent "multi-carrier" structure.

The difference between the traditional OFDMA-structure commonly used in wireless communication networks and DFT-S-OFDMA is that in traditional OFDMA the data symbols are directly mapped onto an arbitrary set of sub-carriers while in DFT-S-OFDMA the data symbols are first transformed by a DFT and then mapped to either a consecutive or an equally spaced set of sub-carriers.

In case of localized mapping however, the mapping onto consecutive sub-carriers in DFT-S-OFDMA leads to several problems. If radio resources for a user in such a wireless communication network are scheduled in the middle of the frequency band then the remaining transmission resource becomes fragmented into two parts. The next user to be scheduled resources may then only use the scheduled resources in one of the remaining fragments as a consequence of the single carrier restriction. This limits the achievable bit rate of that user.

Another area which may result in uplink single carrier frequency fragmentation is the application of DFT-S-OFDMA to frequency hopping. Even if consecutive frequency allocations may be allocated to different UEs in one time interval problems will arise when users hop around in frequency. This becomes a significant problem in case all users are assigned frequency allocations of different sizes.

Also, when it comes to inter cell interference coordination solutions for the uplink resource fragmentation may become a problem. If, for example, it is desired to make it possible for cell edge users in different cells to communicate on orthogonal uplink resources, then a situation may arise where the cell edge user may be allocated transmission resources in the middle of the frequency band which will lead to a fragmented resource in that cell.

It is an object of the current invention to resolve the shortcomings of the currently proposed LTE single carrier solution.

SUMMARY OF THE INVENTION

The object of the invention is achieved by a transmitter device for a wireless communication network comprising a transform unit for transforming a signal from the time domain to the frequency domain, an expansion unit for expanding the transformed signal in the frequency domain and an inverse transform unit for performing the transformation of the expanded signal in the frequency domain back into the time domain where the transmitter further comprises a cyclic shifting unit adapted to perform a cyclic frequency shift for the frequency domain signal over at least part of the available bandwidth for the frequencies used The advantage of this solution is the ability to allocate a user to an available bandwidth without fragmenting it and therefore making it possible for other users to be allocated to the remaining part of the bandwidth.

According to another variant of the present invention the object of the invention is achieved by a transmitter device for a wireless communication network comprising a transmitter device for a wireless communication network comprising a first expansion unit for upconverting an input signal in the time domain, a first convolution unit adapted for cyclically convoluting the upconverted input signal with a first interpolation filter and a first multiplication unit for phase rotating the upconverted and cyclically convoluted input signal producing an output signal, where the transmitter further comprises a second expansion unit for upconverting the output signal in the time domain, a second interpolation unit for cyclically convoluting the output signal with a second interpolation filter and a second multiplication unit for phase rotating the upconverted and cyclically convoluted output signal.

The advantage of this variant is the ability to implement the present invention in the time domain as well.

According to yet another aspect of the present invention the object of the invention is achieved by a method for signal processing in a wireless communication network comprising the steps of:
  performing discrete transformation on a signal from the time domain to the frequency domain;
  expanding the frequency transformed signal in the frequency domain;
  cyclically shifting the frequency transformed signal around at least part of the available bandwidth
  transforming the thus frequency shifted signal from the frequency domain back to the time domain.

According to another variant of the present invention the object of the invention is achieved by a method for signal processing in a wireless communication network comprising the steps of:
  upsampling an input signal in the time domain;

cyclically convoluting the upsampled input signal by multiplying it with a first interpolation filter;
phase rotating the cyclically convoluted input signal producing an output signal;
upsampling the output signal in the time domain;
cyclically convoluting the upsampled output signal by multiplying it with a second interpolation filter;
phase rotating the cyclically convoluted output signal.

Thus, the method according to the present invention may be performed both in the frequency and time domains.

Moreover, another aspect of the present invention is related to a computer program for signal processing in a wireless communication network comprising instruction sets for:
performing discrete transformation on a signal from the time domain to the frequency domain;
expanding the frequency transformed signal in the frequency domain;
cyclically shifting the frequency transformed signal around at least part of the available bandwidth and;
transforming the thus frequency shifted signal from the frequency domain back to the time domain.

According to yet another variant of the present invention the present invention is related to a computer program comprising instruction sets for:
upsampling an input signal in the time domain;
cyclically convoluting the upsampled input signal by multiplying it with a first interpolation filter;
phase rotating the cyclically convoluted input signal producing an output signal;
upsampling the output signal in the time domain;
cyclically convoluting the upsampled output signal by multiplying it with a second interpolation filter;
phase rotating the cyclically convoluted output signal.

The invention will be more readily understood with the help of the detailed description and the accompanying drawings.

DETAILED DESCRIPTION OF PREFERRED EMBODIMENTS

Figure 1:
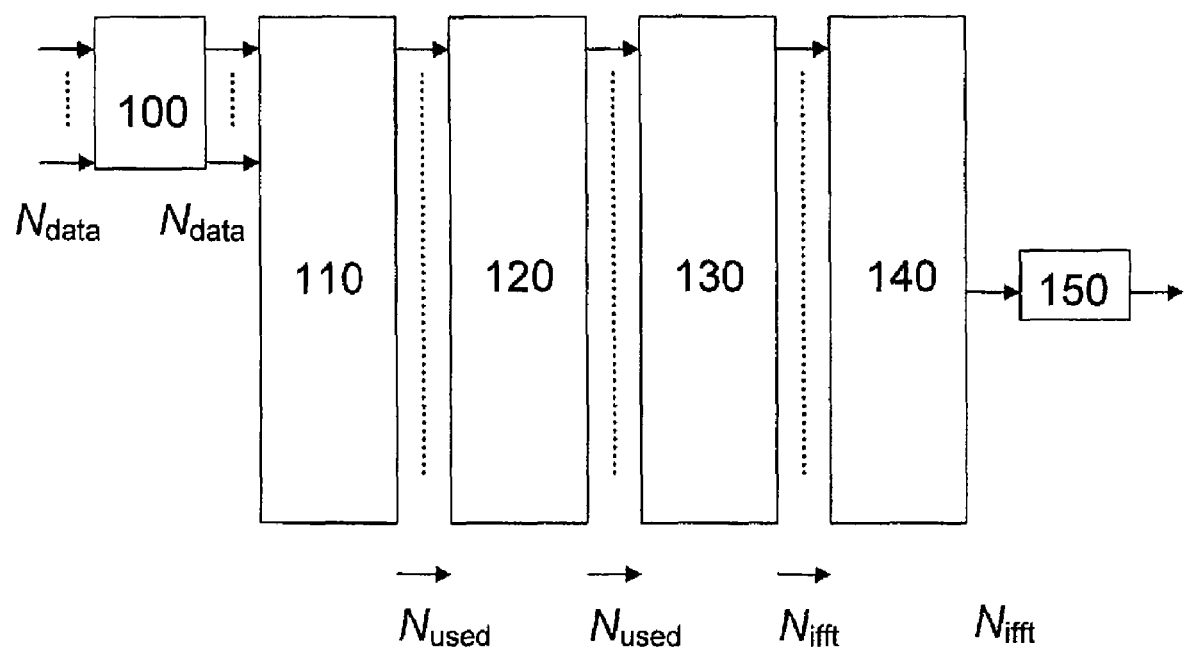
FIG. 1 illustrates a known contemplated DFT-S-OFDMA (Discrete Fourier Transform Spread Orthogonal Frequency Multiple Access) scheme according to the 3G LTE uplink.
Figure 2:
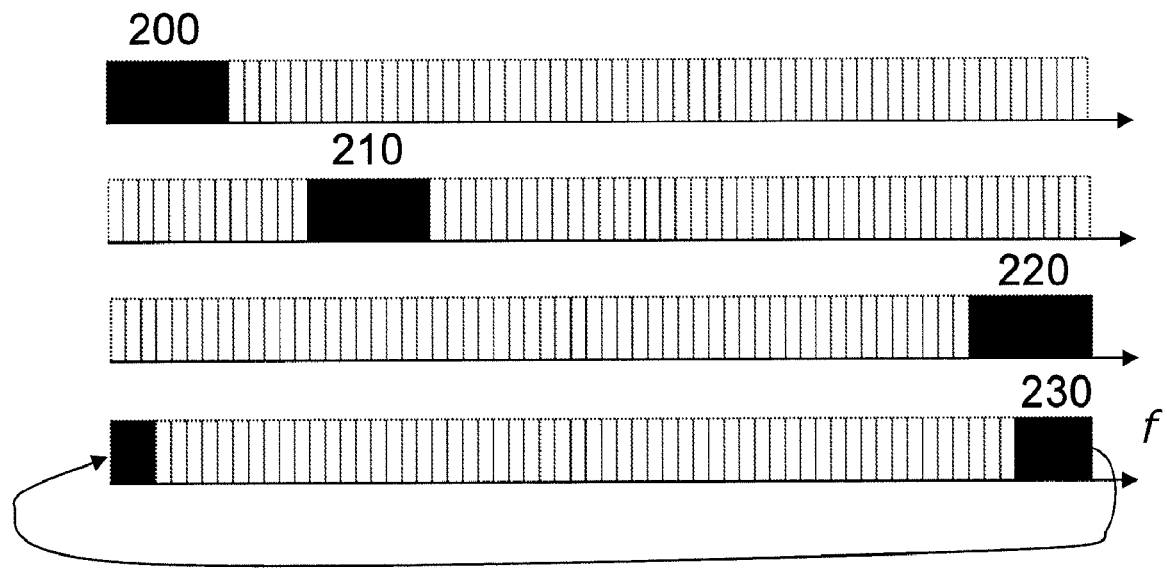
FIG. 2 illustrates the basic principle underlying the present invention.

FIG. 2 illustrates the cyclic wraparound of a DFT spread OFDMA signal according to one embodiment of the present invention.

The block consisting of filled and empty vertical bars represents the available bandwidth expressed as the available frequency spectrum, whereas the filled and empty vertical bars represent allocated and unallocated sub-carrier frequencies, respectively.

A user depicted may for example be allocated sub-carrier frequencies at the beginning of the frequency spectrum shown by the filled vertical bars 200 in the uppermost block.

Also, the $N_{data}$ sub-carrier frequencies allocated to the user may be shifted upwards in the available frequency spectrum as shown by the filled vertical bars 210 and 220 in the second and third blocks. By shifting the sub-carriers assigned to different users by different amounts we can obtain orthogonality between users in the same cell that are transmitting simultaneously.

Finally, using the periodical and symmetrical nature of the DFT, a user may be allocated subcarrier frequencies at the edges of the available frequency spectrum, by performing a so called frequency domain cyclic wrap-around as illustrated by the filled bars 230 and the arrow pointing towards the left edge of the available frequency spectrum.

Event though the cyclic wrap-around over the whole bandwidth may be theoretically possible, it is for practical reasons performed over only a part of the available bandwidth.

One reason for this is that oversampling in the IFFT greatly simplifies the steps of converting the signal from the digital to the analogue domain by means of a digital-to-analogue converter. For this reason it is beneficial to use an IFFT containing more samples than the number of sub-carriers used for transmitting data. The resulting oversampling performed by the IFFT relaxes the requirements that are put on the reconstruction filters used inside of the digital-to-analog conversion unit. Furthermore, it is also common to perform some additional filtering in the digital and/or analogue domains e.g. to ensure that the resulting signal fits inside a certain spectrum mask. Since side lobes from both the low end part and the high end part of the spectrum need to be filtered out it is not sufficient to just perform oversampling in the IFFT by inserting a number of zeros ($N_{last}$) after the last used sub-carriers but also a number of zeros ($N_{first}$) is typically inserted before the first used sub-carrier. Finally, in the up-conversion from an analogue base band signal to a signal on the desired radio frequency some interfering component of the carrier frequency component may leak into sub-carrier number zero (i.e. the DC sub-carrier) which might make that sub-carrier unusable for data communication. Similar problems exists also in the receiver when performing the corresponding steps of down-converting the received signal from radio frequency to base band, base band receiver filtering, and analogue-to-digital conversion.

For the abovementioned reasons it will be difficult to span the data signal over the whole available bandwidth. In other words, the IFFT contains more inputs than the number of used sub-carriers.

Another reason to perform cyclic frequency shift over a part of the bandwidth spanned by the IFFT is that for the LTE uplink the control channels (physical uplink control channel or PUCCH in 3GPP terminology) are located at the high and low end edges of the uplink transmission band. The shared data channel (physical uplink shared channel or PUSCH) is located in the remaining middle part of the spectrum. In order to avoid resource fragmentation when a first user is allocated resources in the middle of the PUSCH band a second user may be allocated all the remaining resources if it is capable of performing cyclic frequency shift over the remaining PUSCH resources. Thus all remaining resources can be allocated the second user and overlap with control channels can be avoided.

Yet another reason to perform cyclic frequency shift over a part of the bandwidth spanned by the IFFT is that it enables frequency dependent scheduling that aims at exploiting the multi-path fading variations of the radio channel also for users with large frequency allocations. In case a user is allocated a small bandwidth then a scheduler can place that user on consecutive resources in the frequency domain where the instantaneous channel conditions are favourable. However, in case the bandwidth of a user is significantly larger than the coherence bandwidth of the channel, any consecutive channel allocation will consist of both good quality resources and bad quality resources. With cyclic wrapping over a partial bandwidth it is possible to allocate one user to two continuous sets of resources that both have favourable radio conditions but are not adjacent in frequency. The data symbols are then cyclically mapped to the frequency resources in accordance with the enclosed invention. In this embodiment the "used part" of the bandwidth over which the cyclic frequency shifting is performed corresponds to the total bandwidth used by one single user. Other users that are simultaneously scheduled may perform cyclic frequency shifts over some other bandwidths.

Figure 3:
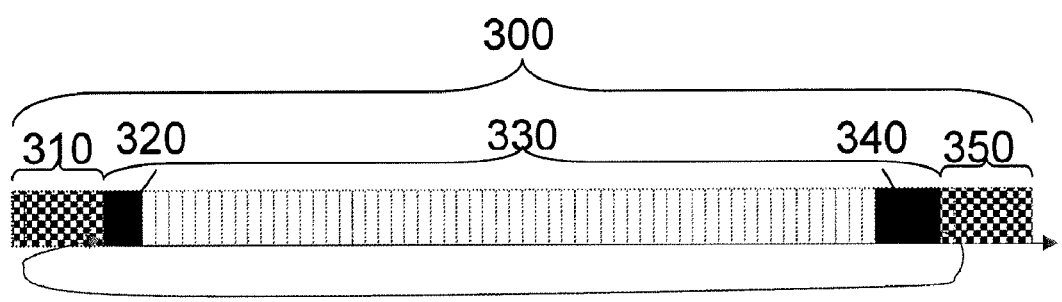
FIG. 3 illustrates the basic principle from FIG. 2 in more detail.

Therefore, in contrast to FIG. 2, FIG. 3 illustrates the cyclic frequency shift over a partial bandwidth. Here, the total number of symbols 300 which may be inserted into the IFFT is divided into a first number of zero valued symbols 310, a number of symbols over which resource allocations to different users may be cyclically shifted 330, and a second number of zero valued symbols 350. The cyclically shifted resource allocation corresponding to one user may now consist of a first part 340 at the high end of the used IFFT input symbols 330 and a second part 320 at the low end of the used IFFT input symbols 330. The zero valued symbols 310 and 350 are inserted in this scheme for the implementation specific reasons discussed earlier (i.e. transmitter side D/A conversion, base band filtering, and up-conversion to RF). The cyclic frequency shift in FIG. 3 is performed over the used part of the IFFT 330. Even though the resulting mapping after the cyclic frequency shift is not performed over a contiguous set of sub-carriers this in fact results in a signal that still has single-carrier properties. This will be explained in more detail later in the text.

Figure 4:
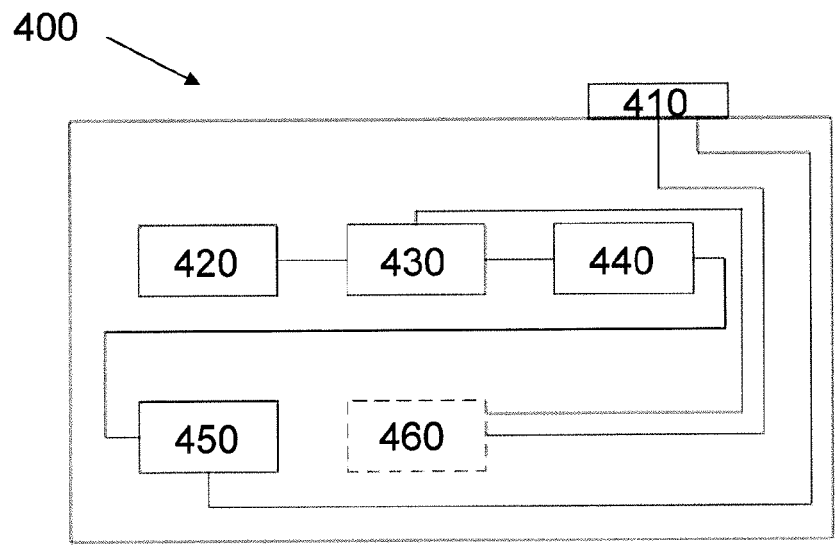
FIG. 4 illustrates a transmitter device according to the present invention.

FIG. 4 illustrates a transmitter device 400 according to one embodiment of the present invention. It should be pointed out that the transmitter device 400 may comprise a base station transceiver, but also a user terminal.

In this example, the transmitter device 400 comprises a receiver/transmitter combination 410 for communication in a wireless communication network. One function of the receiver/transmitter combination 410 may be to receive reports on channel quality from user terminals in the wireless communication network, such as so called CQI-reports (Channel Quality Indicator reports). Based on these reports, the transmitter device 400 may then allocate the appropriate amount of bandwidth for each user terminal. This is valid for the scenario where the transmitter device 400 is a base station transceiver.

Furthermore, the transmitter device 400 also comprises a discrete transformation unit 420 responsible for performing transformation of an input signal from the time domain into the frequency domain by, for example, performing DFT (Discrete Fourier Transform) on the incoming signal. Of course, other types of transforms may be performed on the incoming signal, such as FFT, discrete cosine transform and others as long as they are cyclic in nature. The main point here is to transform the signal into the frequency domain using a cyclic discrete transform.

Moreover, the transmitter device 400 also comprises an expansion unit 430, for expanding the frequency transformed signal in the frequency domain. Expansion may be achieved by block repetition or by other means.

The transmitter device 400 also comprises a frequency shift unit 440 whose task it is to perform a cyclic frequency shift of the frequency transformed and expanded signal. This is simply a frequency shift of a frequency transformed and expanded signal using the cyclic property of the discrete frequency transform where some of the shifted subcarrier frequencies will appear on the left edge of the spectrum as first, second, third carrier frequencies and so on. The number of the carrier frequencies that will reappear on the left edge is simply dependent of the size of the frequency shift. The advantage of the cyclic wraparound performed by unit 440 is that a user terminal may be allocated one portion of the available bandwidth without fragmenting it. Thus, it may be possible to allocate other user terminals to the remaining part of the available bandwidth. This was not possible with known technology where a user terminal having been allocated to the middle of the available bandwidth lead to a bandwidth fragmentation which made it difficulty for other user terminals to use the remaining bandwidth.

The frequency shift unit 440 may also be adapted to oversample the frequency transformed signal by inserting a number of zeroes before and after the first and second used carrier frequencies for example according to the scheme depicted in FIG. 3. In this fashion, the frequency transformed signal will be easier to convert from the digital to the analog domain for the reasons elaborated in the description in FIG. 3 earlier.

Also, the transmitter device 400 additionally comprises a time transform unit 450 adapted for transforming the frequency shifted signal with cyclic wraparound back into the time domain. Usually, the transmitter device 400 will be adapted to perform a time transformation of the frequency shifted signal which uses the transform inverse to the frequency transform performed by the discrete frequency transformation unit 420.

Optionally, the transmitter device may comprise a frequency synchronisation unit 460 responsible for performing tasks such as frequency hopping for the above frequency signal processed by the frequency shift unit 440. The frequency synchronisation unit 460 may here be adapted for synchronising the cyclic frequency wraparound with other frequency synchronisation units in other transmitter devices. These frequencies used in the various transmitter devices may be either preconfigured (in which case the frequency synchronisation unit 460 would not be necessary) or communicated to other transmitter devices by the frequency synchronisation unit 460 via the transmitter/receiver combination 410. In this fashion, the risk of two transmitter devices using the same frequency spectrum at the same time and thus causing interference may be reduced.

It may be appreciated here that the units of the transmitter device 400 which in the example above are adapted for performing the above signal operations in the frequency domain may also be adapted for performing equivalent operations in the time domain.

In such a case, the transformation unit 420 may perform signal transformation from the time into the frequency domain or vice versa, while the inverse transformation unit 450 may perform the identical operation but as an inverse transform operation. However, for the time domain implementation the transformation and inverse transformation units 450 may not bee needed if the signal already is in the time domain.

The expansion and shifting units 430, 440 may in the time domain be realized as first and a second expansion, convolution and multiplication units (not shown) performing a signal operation equivalent to the cyclic frequency shift in the frequency domain. The first and second expansion units may then be adapted to perform a first and second upsampling, while the first and second convolution units may be adapted to perform a first and a second cyclical convolution. Also, the first and second multiplication units may be adapted for performing a first and a second phase rotation. These corresponding operations will not be explained in detail, since they are assumed to be known to a skilled person having read the disclosure of the present invention. Also, the synchronisation unit 460 may additionally perform time synchronisation as the equivalent to frequency synchronisation in the frequency domain.

Figure 5:
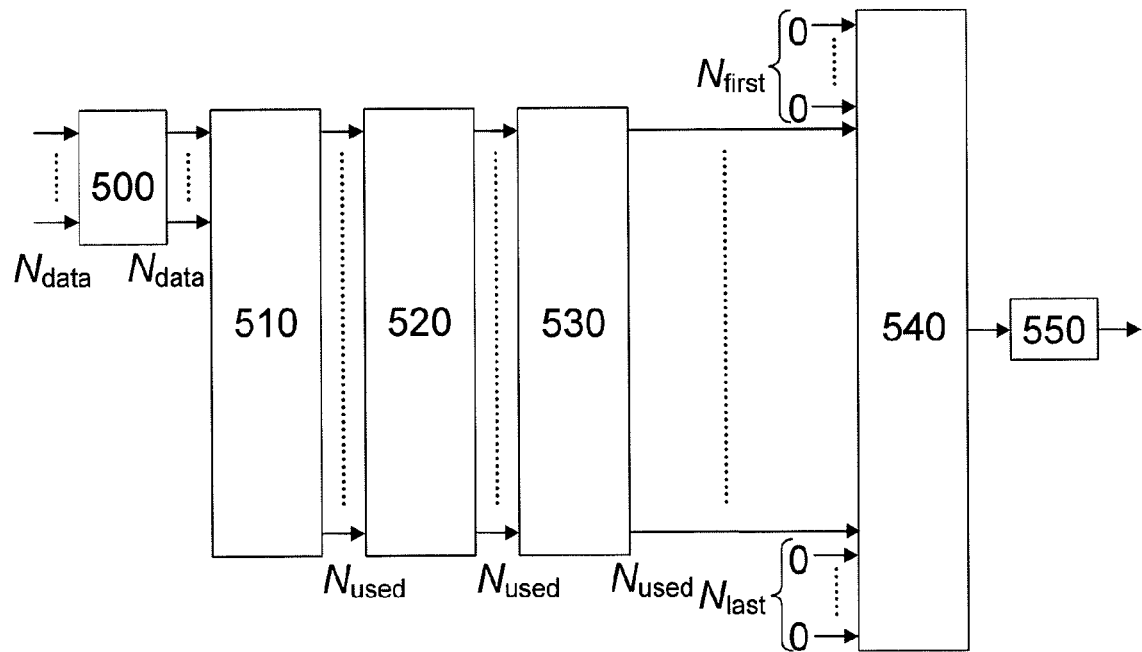
FIG. 5 represents a block diagram of a transmitter implementing one embodiment of the present invention.

FIG. 5 depicts a block diagram depicting the method steps performed by the transmitter from FIG. 4 according to one embodiment of the present invention.

A number of data symbols $N_{data}$ is transformed into the frequency domain at step 500 by using a DFT-transform. At step 510, the DFT-transformed $N_{data}$ symbols are expanded in bandwidth by for example using block repetition. Hence, the number of symbols is increased from the original $N_{data}$ number of symbols to the $N_{used}$ number of symbols. Thereafter, at step 520, frequency domain filtering is performed on the now expanded $N_{used}$ symbols. So far, the steps performed are identical to those of the proposed DFT-S-OFDM method.

However, at step 530, a cyclic frequency shift is performed on the filtered $N_{used}$ number of data symbols thus avoiding fragmentation of the remaining available bandwidth.

Next, at step 540, the $N_{first}$ and $N_{last}$ number of zeroes are inserted before and after the first and second used carrier frequencies and an IFFT transformation operation is performed on the $N_{ifft}$ number of data symbols. Note that in theory both $N_{first}$ and $N_{last}$ may be equal to zero but for practical implementation reasons the preferred embodiment of this invention is the case when both $N_{first}$ and $N_{last}$ are larger than zero.

Finally, after the thus cyclically shifted and zero-filled sub-carriers are consecutively mapped into the IFFT a sequential bitstream is created, whereafter at step 550 a CP is appended to the sequential bitstream.

Figure 6:
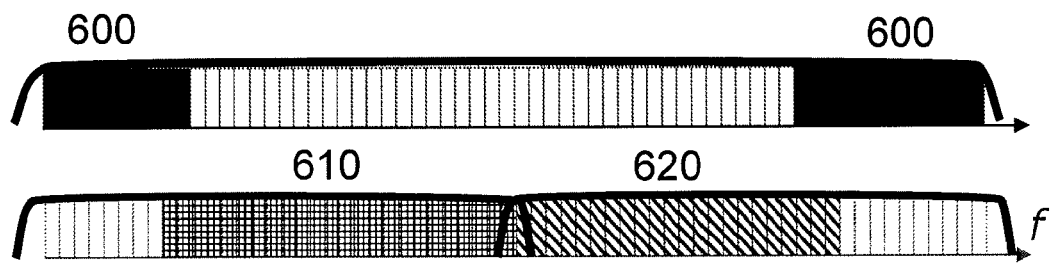
FIG. 6 is a schematic representation of two transmitters with filters covering different amounts of the available bandwidth.

Note that not all UEs (User Equipments) may be able to perform frequency domain wrap around. One obvious requirement is that the UE has a transmitter filter that covers the whole available bandwidth. In the example shown in FIG. 6 a user 600 with a transmission filter that covers the whole bandwidth and two users 610, 620 which have transmission filters that only cover half of the totally available system bandwidth are shown. A scheduler designed to allocate resources to these users must thus be aware of which UEs that are capable of performing a cyclic frequency domain wrap-around (600) and which are not (610, 620).

It may be appreciated that the operations performed in FIG. 5 may equally be performed by equivalent operations in the time domain, since, for example, an operation in the frequency domain always has an equivalent in the time domain and vice versa. Thus, for example an operation in the time domain equivalent to bandwidth expansion performed in step 510 in FIG. 5 would be upsampling of data symbols in the time domain. This would have to be performed twice in the time domain. Frequency filtering at step 520 may be equalled by a corresponding filtering in the time domain. Likewise, the cyclic frequency shift performed at step 530 in FIG. 5 may be equalled by a corresponding cyclical convolution with an interpolation filter and subsequent phase rotation by means of multiplication by a phasor vector at a first stage plus a cyclical convolution and phase rotation at a second stage.

Figure 7:
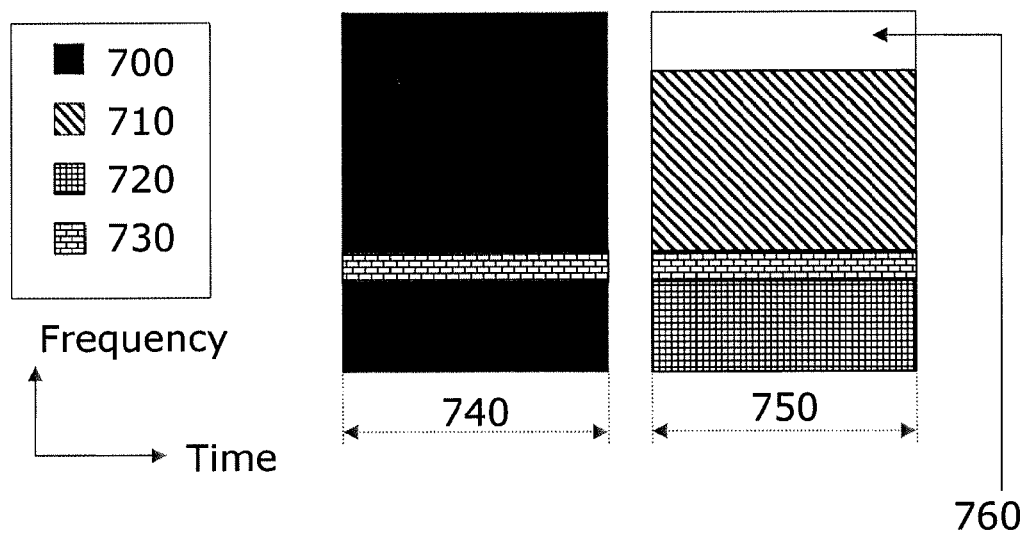
FIG. 7 illustrates fragmentation loss in a wireless communication network.

FIG. 7 depicts a comparison between a full-bandwidth capable UE 700 versus two half-bandwidth capable UEs 710, 720 over two frames represented as the width of the blocks 740 and 750.

The part of the available bandwidth depicted with reference number 730 represents the control resources needed for uplink control signalling for users that were not scheduled to transmit data in this frame.

In the left-most FIG. 740, a full bandwidth capable UE may fill the remaining resource if there is an allocation in the middle of the frequency band e.g. for uplink control signalling from non scheduled UEs.

In contrast, we see in the right-most FIG. 750 a case where the scheduled users 710, 720 are not capable of transmitting over the whole system bandwidth. In this case fragmentation loss 760 will occur in case the user 720 has more data to send and enough available transmit power to be able to utilize a larger resource allocation.

Figure 8:
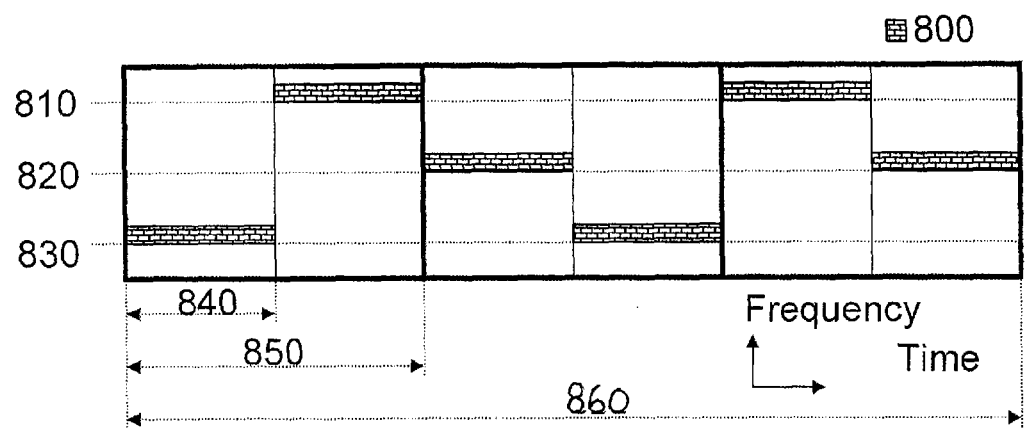
FIG. 8 illustrates a second embodiment of the present invention.

Uplink frequency hopping may be realized by simply changing which of the $N_{used}$ sub-carriers that we index as number zero. This is shown as an example in FIG. 8, where the grey bars represent the uplink control resource 800. Furthermore, the sub-carrier zero reference index in subframes 2 and 5 is depicted by the reference number 810, while its position in subframes 3 and 6 and 1 and 4 are depicted by reference numbers 820 and 830. Reference number 840 represents the length of one sub-frame, while reference number 850 and 860 represent the length of one TTI (Transmission Time Interval) and one hopping pattern period, respectively.

It is assumed that both uplink control resources 800 and scheduled resources (not shown) hop around in frequency. It is further assumed in this example that the uplink control resources for ACK/NACK/CQI (Acknowledged/Not Acknowledged/Channel Quality Indicator) signaling for UEs that do not have uplink data start at the relative index 0. These control resources 800 are schematically drawn as a brick-shaped pattern, while the resources available for scheduled data are displayed in white.

However, it may be equally possible to let the control resources 800 be locked to certain frequencies and to perform frequency hopping on the scheduled resources only.

Frequency hopping is a simple and efficient way of handling inter-cell interference. By selecting different hopping patterns in neighboring cells one may achieve a randomization of the inter-cell interference. The hopping patterns may be orthogonal, in which case they essentially never overlap, or they may be pseudo-random with low probability of overlapping.

However, the current invention also allows for some more advanced inter-cell interference co-ordination (ICIC) schemes. For example, the same frequency hopping pattern may be used in neighboring cells and different frequency offsets may be selected for each interfering cell. By hopping in a synchronized fashion it is ensured that the interference on one relative sub-carrier becomes predictable over the whole hopping pattern period. Hence the link adaptation and scheduling may adapt to the current interference situation.

This is especially attractive in a scheduled uplink scenario, since then it is expensive to obtain channel quality knowledge for all users. Typically, in order to support channel dependent scheduling each user would be required to send periodic sounding signals over the whole bandwidth so that the base station could estimate the channel quality over the full bandwidth for each user. This knowledge could be used by the base station in order to perform channel dependent scheduling and link adaptation. However, since users must be allocated to cyclically continuous sub-carriers it is difficult to obtain any multi user diversity gain without having a large number of users with small resource allocations. And since a large number of users results in a large number of uplink channel sounding transmission consuming a large portion of the uplink capacity, it is unlikely that there will be any real gain left.

However, if we are using frequency hopping on the uplink then the link adaptation does not have to follow the fast fading and it can instead adjust to the slowly varying path gain and the different inter-cell interference that are received on the different sub-carriers. The inter-cell interference can be estimated by the base station without any channel sounding signals from the UEs and the slowly varying path gain on the uplink can e.g. be approximated as being equal to the path gain on the downlink. Thus with synchronized cyclic frequency hopping it is possible to perform scheduling and link adaptation based on the frequency dependent inter-cell interference.

In the uplink it is the users at the cell edge that cause the most interference in the neighboring cells. They are also often power limited and can therefore often not make use of the full bandwidth. Hence it is possible to start allocating resources to cell edge users from the relative resource index zero in each cell. And if the relative index zero is different in interfering cells it is assured that the cell edge users do not collide with each other on the same resource. This is schematically depicted in FIG. 9 below.

Figure 9:
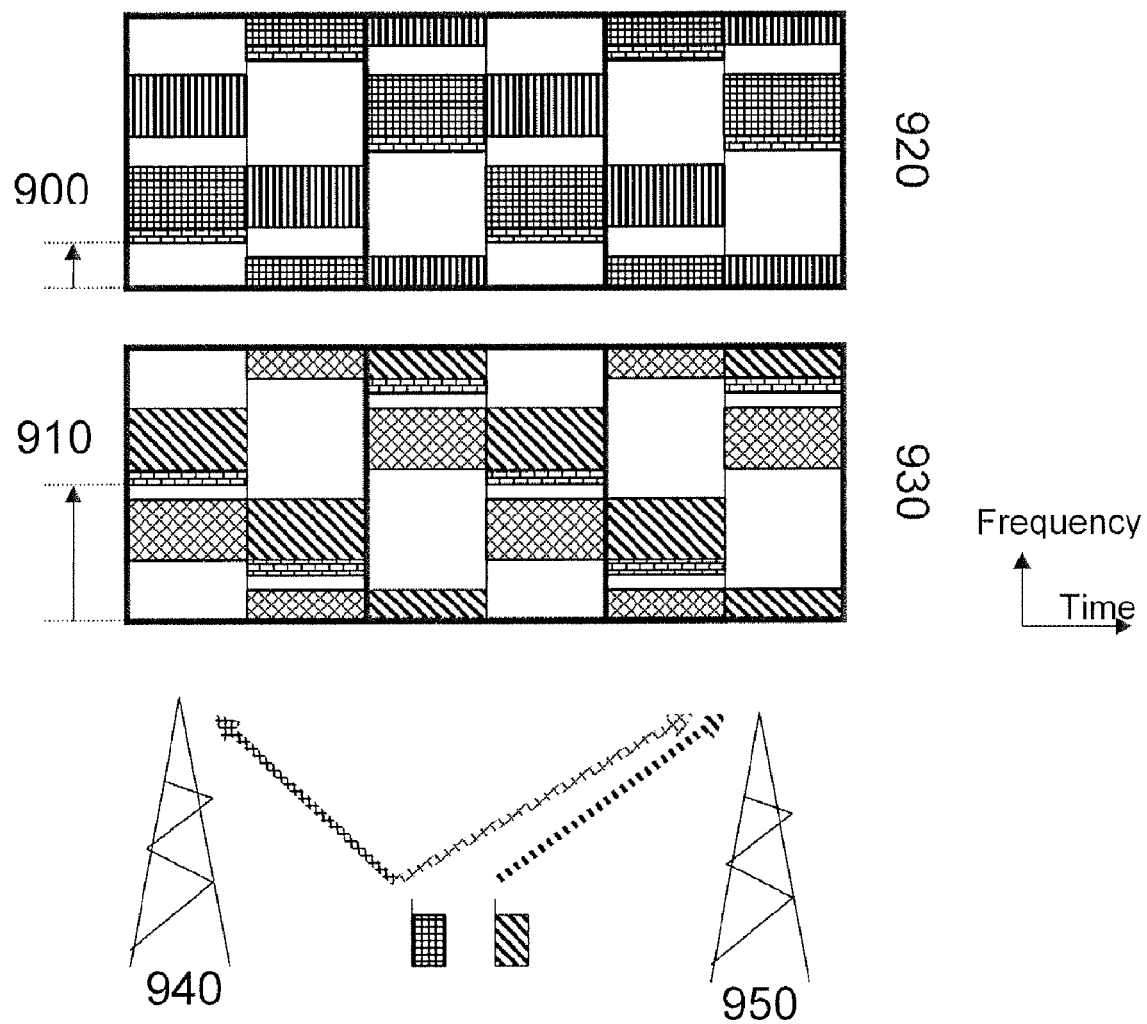
FIG. 9 illustrates the second embodiment of the present invention from FIG. 7 applied to overlapping cells.

FIG. 9 illustrates inter-cell interference coordination with synchronised cyclic frequency hopping and different initial offset in neighbouring cells.

The initial offset for cell 1 920 is depicted as 900, while the initial offset 910 for cell 2 930 is depicted with 910. The first user is located at the edge of cell 1 920 and depicted by the grid-lined areas in cell 1 920, while the second user is located at the edge of cell 2 930 depicted by the shadowed areas in cell 2 930.

Since both users are located at the edges of cell 1 and cell 2 (920, 930) interferences from the first and second users are likely to occur. Therefore, the interference from the second user in cell 1 920 is depicted by the gray-barred areas, whereas interference from the second user in cell 2 930 is depicted by the knitted areas in cell 2 930.

Uplink control resources for each user in each of the cells 920, 930 are represented by the brick-shaped areas.

In FIG. 9 we see that the interference from the second user marked with shadowed lines in cell 2 930 stays at the same relative position in cell 1 920 over the hopping period. Note that it is the cyclic frequency wrapping that enables this.

Cell edge users are placed at the same relative frequency position in each cell to avoid collision. Furthermore, path gain measurements in neighboring cells which a user terminal any way needs to perform for hand over reasons, can be used to provide good predictions on the level of caused interference in neighboring cells. Since the frequency hopping effectively provides diversity over the fast fading, we can approximate the interference caused by the users that are scheduled in one cell as the transmitted power level times the path gain to the corresponding interfered cell. This information may be used in the scheduling decision as well, e.g. we might want to assure that the interference that we cause on resources used for control signaling in a neighboring cell is below a threshold.

Figure 10:
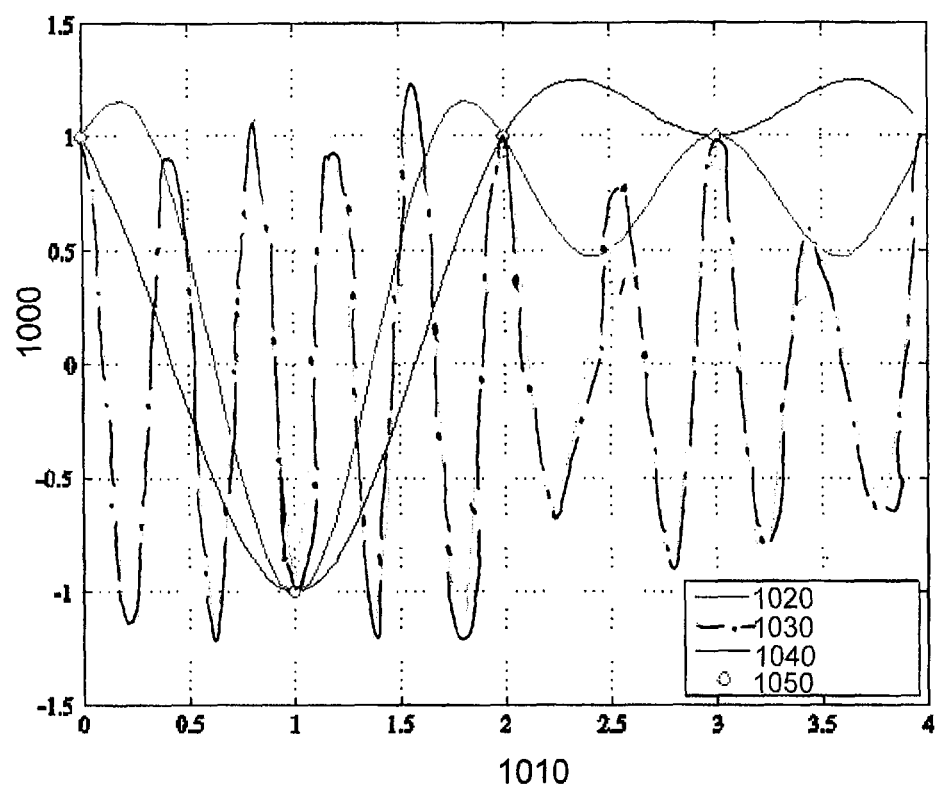
FIG. 10 represents simulation results of the method according to a first embodiment of the present invention.

In FIG. 10 we see a simple example of cyclic frequency shifts when the number of used symbols is equal to the number of IFFT-inputs, i.e. when $N_{used}=N_{ifft}$. The graph in FIG. 10 shows the output from the IFFT-transformation as an amplitude 1000 versus time 1010 diagram, where four input data symbols ($N_{data}=4$) 1050 are oversampled into 64 data symbols ($N_{used}=64$) which are IFFT-transformed into the time domain. The original data points sampled are X=[1 −1 1 1] represented by the reference number 1050. Moreover, the curve with the reference number 1040 is the one that wraps around the frequency edge, since it is cyclically frequency-shifted by 62 sub-carriers. Also FIG. 10 shows a curve 1020 that is the IFFT-transformed curve without cyclic frequency shift (note that the original data samples are interpolated by a sinc-like (sin(x)/x) function) and another curve 1030 which is shifted in frequency by 8 sub-carriers.

Figure 11:
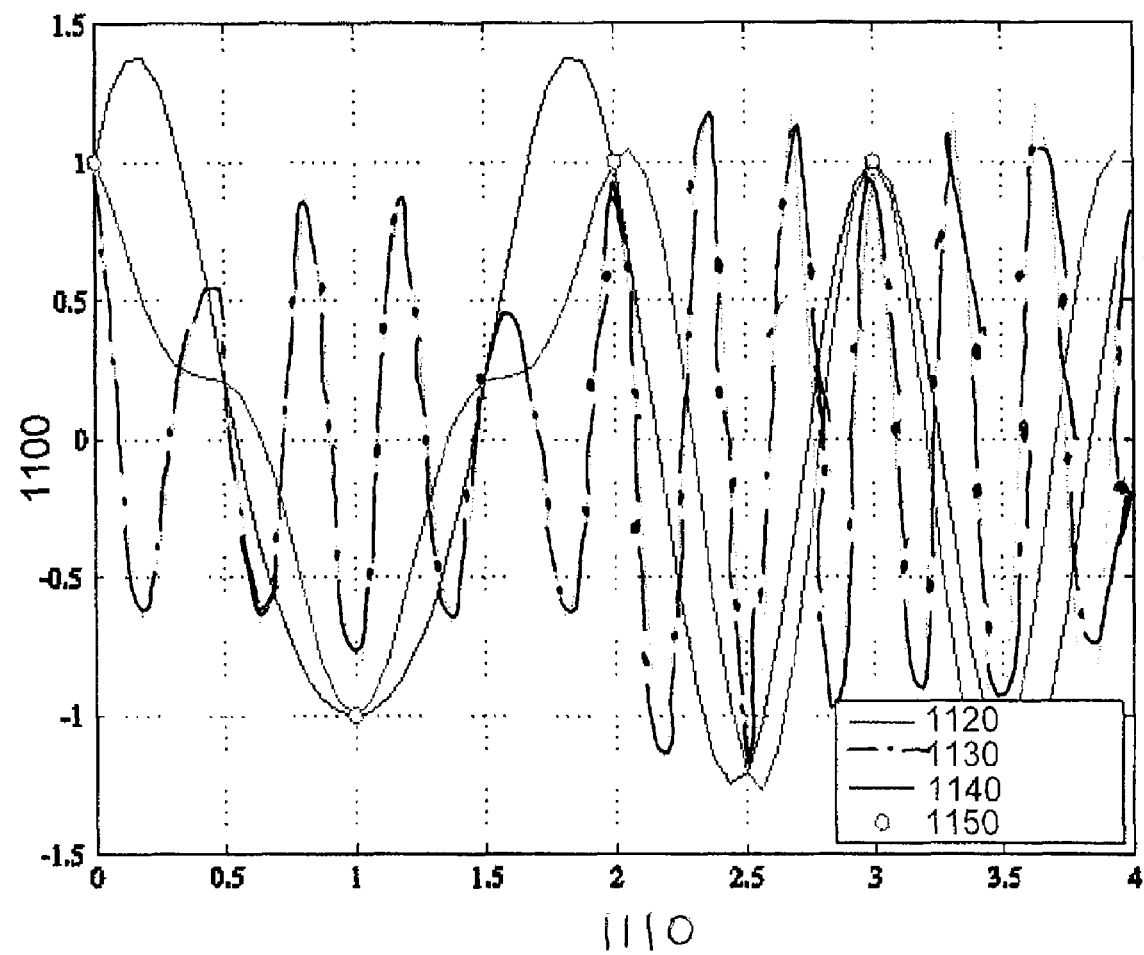
FIG. 11 represents simulation results of the method according to a second embodiment of the present invention.

In FIG. 11 we see a simple example of cyclic frequency shifts when the number of used symbols is less then the number of IFFT-inputs, i.e. when $N_{used}<N_{ifft}$. As in the previous example in FIG. 10, the curves represent the IFFT outputs, where their amplitude 1100 is shown as a function of time 1110. In the example illustrated, the original data samples 1150 are identical to the ones in the example in FIG. 9, i.e. X=[1 −1 1 1], which means that the number of data samples is $N_{data}=4$, whereas the number of used sub-carrier symbols is $N_{data}=60$. Moreover, the number of zeroes inputted before the first used sub-carrier (not shown) is $N_{first}=2$, while the number of zeroes inputted after the second used sub-carrier is also $N_{last}=2$. Also, the number of IFFT-inputs was $N_{ifft}=64$.

In this example, the curve depicted with the reference number 1140 wraps around the frequency edge and is cyclically frequency-shifted by 58 sub-carriers. We note that we still have a signal that is equal to the data points [1 −1 1 1] in the sampling instances. Curves with the reference numbers 1120 and 1130 represent the IFFT-transformed signals which are cyclically shifted by 0 and 8 sub-carriers respectively. Note that the curve 1120 is actually frequency translated by two sub-carriers by the insertion of the $N_{first}=2$ zero valued samples before the first used data sub-carrier. It appears that the curve 1140 that is cyclically wrapped around the edge of the $N_{used}$ data sub-carriers has somewhat larger envelope variations than the non wrapped curves (the curves with the reference numbers 1120 and 1130). The reason is that the curve 1140 is actually over-sampled and frequency translated two times while the non wrapped curves could be seen as having only a single over-sampling and frequency translation step. The first over-sampling and frequency translation takes place when expanding from $N_{data}$ to $N_{used}$ samples in step 510, 520, and 530 of FIG. 5. The second over-sampling and frequency translation step takes place in the IFFT 540 where the signal is expanded from $N_{used}$ to N samples and an additional frequency shift is introduced by the $N_{first}$ zeros inserted before the first used data sub-carrier. However in the case when there is no frequency wrapping (i.e. for the curves 1120 and 1130) these two consecutive over-sampling and frequency translation steps can be combined into one single over-sampling and frequency translation step. Since every over-sampling step introduces some envelope variations due to the sinc-like shape of the resulting interpolation function we get slightly larger envelope variations for the cyclically frequency wrapped curve 1140. This effect is further examined in FIGS. 12 and 13.

Figure 12:
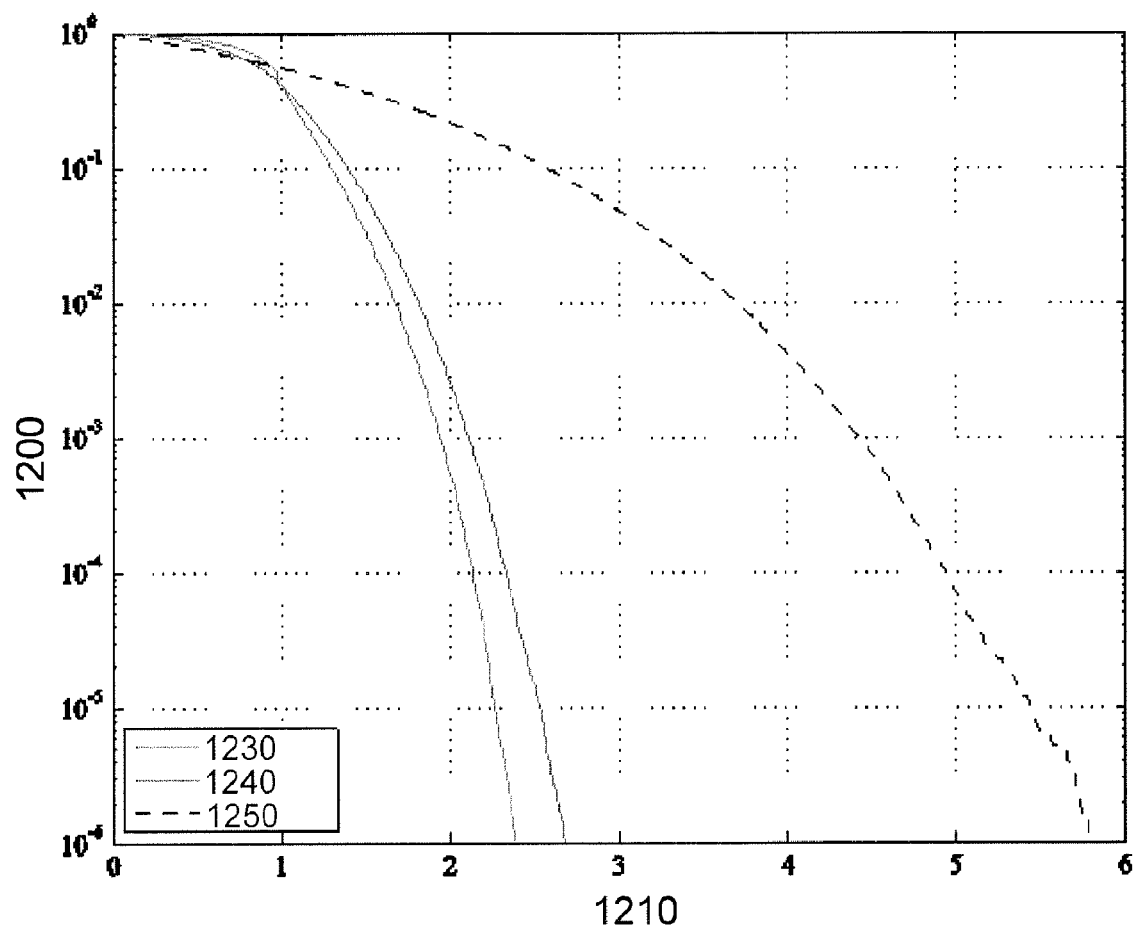
FIG. 12 represents simulation results of the method according to a third embodiment of the present invention.

In FIG. 12 we show an example of the envelope distribution when using QPSK modulation. Here, we see the probability 1200 that the absolute amplitude of the resulting cyclically wrapped (CW) DFT-S-OFDM signal is larger than a value 1210. In FIG. 12 the average power of the CW-DFT-S-OFDM signal is normalized to one. The number of data samples this time was $N_{data}=72$ which corresponds to the case when 6 resource blocks each consisting of 12 sub-carriers each are used (the size of a resource-block is in line with the current numerology assumed for the LTE uplink in 3GPP). Moreover, the number of usable sub-carriers, $N_{used}$ equals 300 and the IFFT size is $N_{ifft}=512$, and $N_{first}=N_{last}=106$. The original data samples are taken from random QPSK-modulated data and statistics were collected over 10000 CW-DFT-S-OFDM symbols. It can be seen that the curve 1230 where a cyclic frequency shift of 280 sub-carriers is performed shows somewhat larger envelope variations than the curve 1240 which is not wrapped around the $N_{used}$ frequency edge (the cyclic shift 0 was used for 1240). As a reference, the dashed black curve 1250 shows the envelope distribution of OFDM with the same parameters. We see that the envelope variations of CW-DFT-S-OFDM is significantly lower than that of OFDM.

Figure 13:
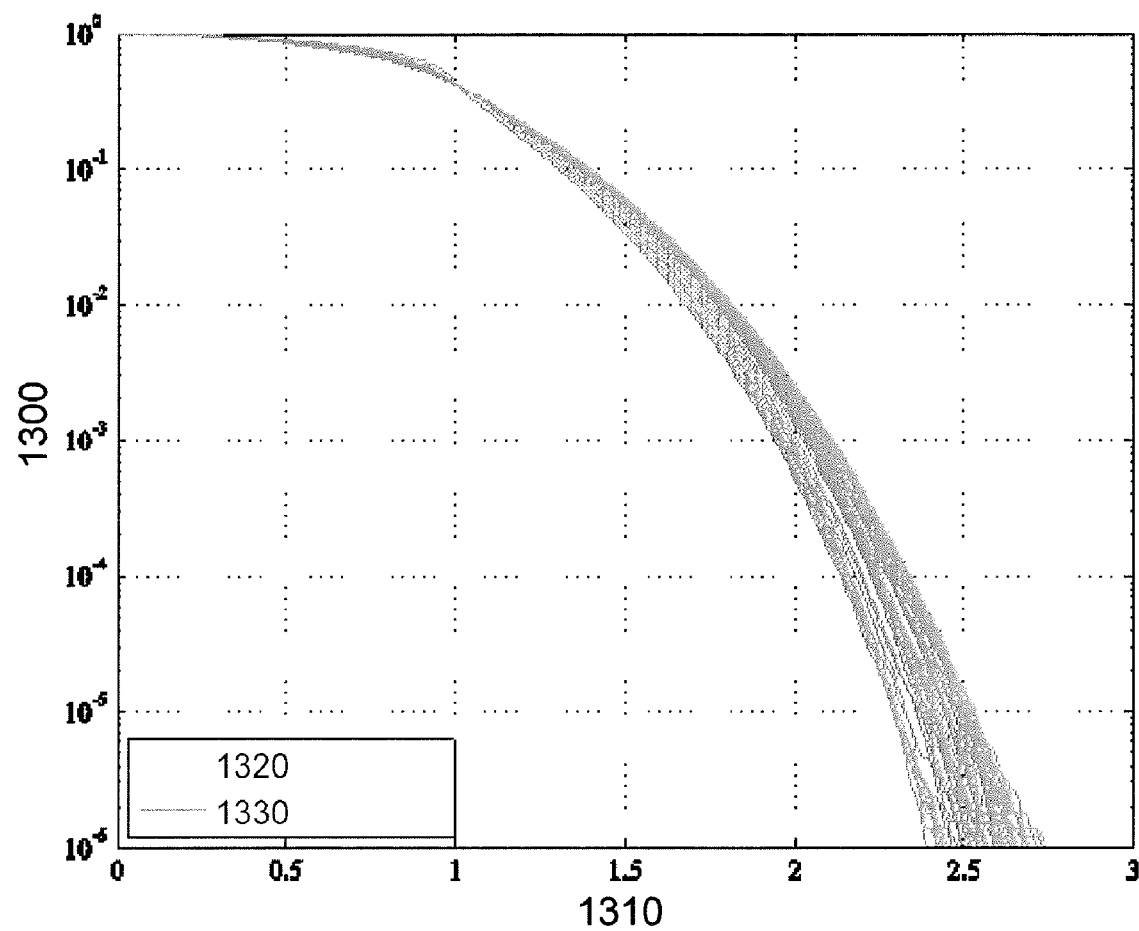
FIG. 13 represents simulation results of the method according to a fourth embodiment of the present invention.
Figure 14:
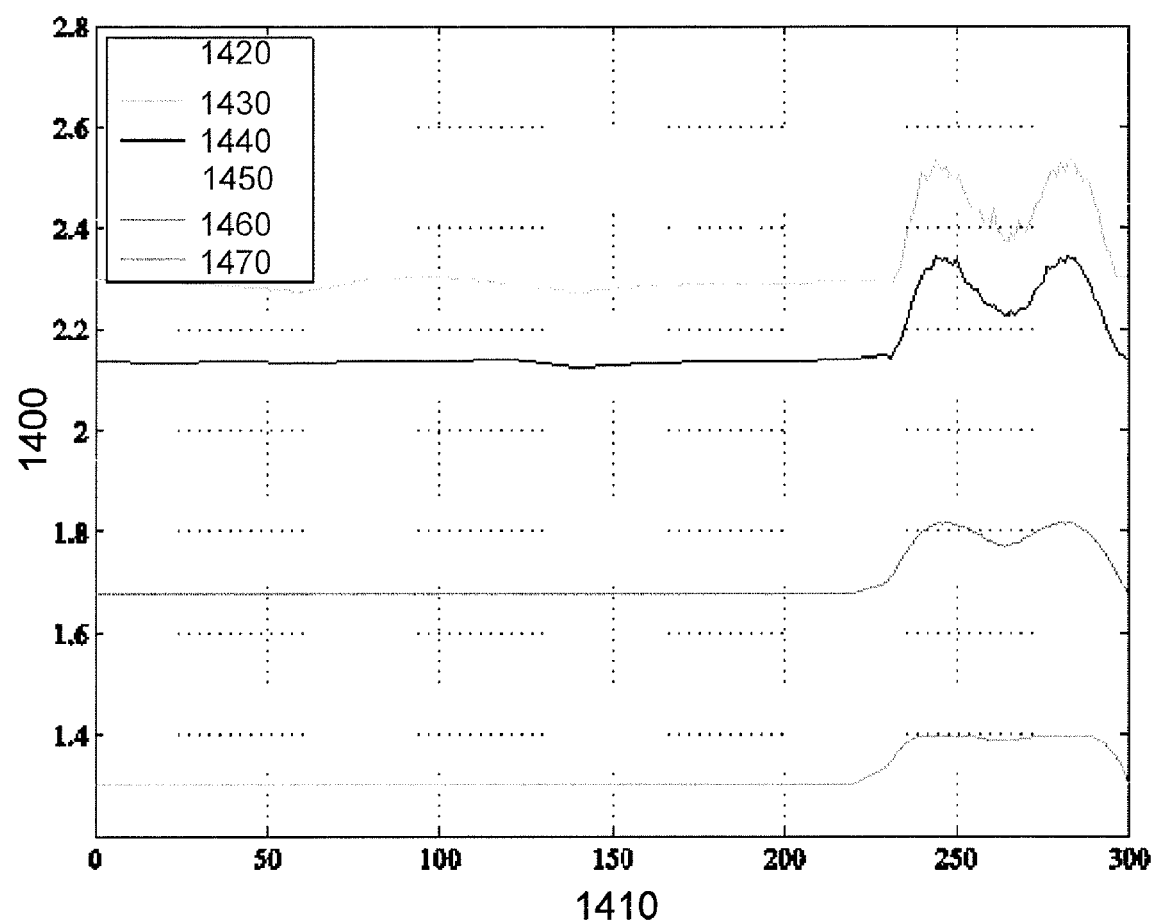
FIG. 14 represents simulation results of method according to a fourth embodiment of the present invention in more detail.

In FIGS. 13 and 14 it is examined how the envelope distribution varies with the size of the cyclic shift. In these figures, the number of original data symbols was $N_{data}=12\times6=48$, while the number of used data symbols was $N_{used}=300$. The number of inserted zeroes before the first used sub-carriers was $N_{first}=106$ and after the second used sub-carriers $N_{last}=106$. The number of IFFT-inputs was $N_{ifft}=512$ where the original data sampled was QPSK-modulated and where statistics had been collected over 10000 symbols. Analogously to the curves in FIG. 12, the graphs shown are the IFFT-transformed signals, where the probability 1300 that the absolute amplitude of the CW-DFT-S-OFDM modulated signal is larger than a value 1310.

The curve 1320 in light grey in FIG. 13 represents frequency shifts that are less than or equal to $N_{used}-N_{data}$, i.e. the cases when no cyclic frequency wrapping occurs. The black curves 1330 represent the cases when frequency wrapping occurs. We see that there is a small penalty in terms of an envelope variation increase when we wrap around the frequency.

In FIG. 14 it is demonstrated how the envelope variation varies with the size of the cyclic frequency shift. The curves listed from top to bottom in the box in FIG. 14 show the signal envelope of the CW-DFT-S-OFDM modulated signal at different probabilities, i.e. from $10^{-1}$ 1420 down to $10^{-6}$ 1470. The values in FIG. 14 can be directly compared to the values shown in FIG. 12.

As a final remark, it may be mentioned that the method steps described in FIG. 5 and the frequency hopping explained earlier and illustrated in FIGS. 7 and 8 may be implemented by a computer program executed inside the terminal device 400 in FIG. 4. However, the computer program may also be stored in a memory (not shown) of the terminal device 400 or executed on an ASIC (Application Specific Integrated Circuit).

A skilled person having read the above disclosure may quite possibly contemplate other embodiments of the present invention. Ultimately, the scope of the present invention is only limited by the accompanying claims.

The invention claimed is:

1. A Discrete Fourier Transform Spread Orthogonal Frequency Multiple Access (DFT-S-OFDMA) transmitter device for a wireless communication network comprising:
   a transform unit using a transform with cyclic properties configured to transform a signal from a time domain to a frequency domain;
   an expansion unit configured to expand the transformed signal in the frequency domain;
   an inverse transform unit configured to transform the expanded signal in the frequency domain back into the time domain; and
   a shifting unit configured to perform, for uplink sub-carrier frequencies allocated to a user of the transmitter, a cyclic frequency shift of the frequency transformed and expanded signal upwards in at least part of the available bandwidth of the inverse transform unit such that the cyclically shifted sub-carrier frequencies corresponding to the user comprise a first part at a high end of the available bandwidth and a second part at a low end of the available bandwidth.

2. The transmitter device of claim 1 wherein the shifting unit is further configured to perform oversampling on the frequency-transformed signal.

3. The transmitter device of claim 2 wherein the shifting unit is further configured to perform the oversampling by a inserting a number of empty carrier radio resources before a first number of used radio resources in the available bandwidth.

4. The transmitter device of claim 3 wherein the shifting unit is further configured to perform the oversampling by a inserting a number of empty carrier radio resources after a second number of used radio resources in the available bandwidth.

5. The transmitter device of claim 4 wherein the shifting unit is further configured to translate the first number and the second number of used radio resources in the frequency domain.

6. The transmitter device of claim 5 further comprising a synchronisation unit to transmit information indicative of a beginning of the used radio resources, and the translation of the first and second number of used radio resources in the frequency domain.

7. The transmitter device of claim 1 wherein the transmitter device is associated with one of a base station, an access point, and a user equipment (UE).

8. A method of processing a signal in a Discrete Fourier Transform Spread Orthogonal Frequency Multiple Access (DFT-S-OFDMA) transmitter operating in a wireless communication network, the method comprising:
   performing discrete transformation on a signal of a user terminal from a time domain to a frequency domain using a transform with cyclic properties;
   expanding the frequency transformed signal in the frequency domain;
   for uplink sub-carrier frequencies allocated to a user of the transmitter, cyclically shifting the expanded transformed signal upwards in at least part of the available bandwidth of an inverse transform unit such that the cyclically shifted subcarrier frequencies corresponding to the user comprise a first part at a high end of the available bandwidth and a second part at a low end of the available bandwidth; and
   transforming the frequency shifted signal from the frequency domain back to the time domain.

9. The method of claim 8 further comprising performing oversampling on the frequency-transformed signal.

10. The method of claim 9 wherein performing the oversampling comprises inserting a number of empty carrier radio resources before a first number of used radio resources in the available bandwidth.

11. The method of claim 10 wherein performing the oversampling further comprises inserting a number of empty carrier radio resources after a second number of used radio resources in the available bandwidth.

12. The method of claim 11 further comprising translating the first number and the second number of used radio resources in the frequency domain.

13. The method of claim 12 further comprising transmitting information indicative of a beginning of the used radio resources, and the translation of the first and second number of used radio resources in the frequency domain.

14. A computer readable medium including instructions configured to control the signal processing in a Discrete Fourier Transform Spread Orthogonal Frequency Multiple Access (DFT-S-OFDMA) transmitter operating in a wireless communication network, the instructions configured to cause the transmitter to:
perform discrete transformation on a signal of a user terminal from a time domain to a frequency domain using a transform with cyclic properties;
expand the frequency transformed signal in the frequency domain;
for uplink sub-carrier frequencies allocated to a user of the transmitter, cyclically shift the expanded transformed signal upwards in at least part of the available bandwidth such that the cyclically shifted sub-carrier frequencies corresponding to the user comprise a first part at a high end of the available bandwidth and a second part at a low end of the available bandwidth; and
transform the frequency shifted signal from the frequency domain back to the time domain.

15. The computer readable medium of claim 14 wherein the instructions are further configured to control a shifting unit in the transmitter to perform oversampling on the frequency-transformed signal.

16. The computer readable medium of claim 15 wherein the instructions are further configured to control the shifting unit to perform the oversampling by a inserting a number of empty carrier radio resources before a first number of used radio resources in the available bandwidth.

17. The computer readable medium of claim 16 wherein the instructions are further configured to control the shifting unit to perform the oversampling by a inserting a number of empty carrier radio resources after a second number of used radio resources in the available bandwidth.

18. The computer readable medium of claim 17 wherein the instructions are further configured to control the shifting unit to translate the first number and the second number of used radio resources in the frequency domain.

19. The computer readable medium of claim 18 wherein the instructions are further configured to control a synchronisation unit in the transmitter to transmit information indicative of a beginning of the used radio resources, and the translation of the first and second number of used radio resources in the frequency domain.

20. The computer readable medium of claim 14 wherein the transmitter controlled by the instructions is associated with one of a base station, an access point, and a user equipment (UE).

* * * * *

UNITED STATES PATENT AND TRADEMARK OFFICE
CERTIFICATE OF CORRECTION

| | | |
|---|---|---|
| PATENT NO. | : 7,983,145 B2 | Page 1 of 1 |
| APPLICATION NO. | : 12/513315 | |
| DATED | : July 19, 2011 | |
| INVENTOR(S) | : Frenger | |

It is certified that error appears in the above-identified patent and that said Letters Patent is hereby corrected as shown below:

On the Face Page, in Field (54), and Column 1, Line 1, in Title, delete "OFTM" and insert -- OFDM --, therefor.

On the Face Page, in Field (57), under "ABSTRACT", in Column 2, Line 2, delete "spread-OFDM" and insert -- spread-OFDMA --, therefor.

In Column 12, Line 48, in Claim 8, delete "Multiple" and insert -- Division Multiple --, therefor.

In Column 3, Line 42, delete "Multiple" and insert -- Division Multiple --, therefor.

In Column 10, Line 62, delete "N" and insert -- $N_{ifft}$ --, therefor.

In Column 12, Line 3, in Claim 1, delete "Multiple" and insert -- Division Multiple --, therefor.

In Column 13, Line 18, in Claim 14, delete "Multiple" and insert -- Division Multiple --, therefor.

Signed and Sealed this
Twenty-eighth Day of August, 2012

David J. Kappos
*Director of the United States Patent and Trademark Office*